United States Patent
Mahmood et al.

(10) Patent No.: US 9,420,556 B2
(45) Date of Patent: Aug. 16, 2016

(54) METHOD AND APPARATUS FOR HANDLING CIRCUIT SWITCHED CALLS AT A USER EQUIPMENT

(71) Applicant: BlackBerry Limited, Waterloo (CA)

(72) Inventors: Hamid Mahmood, Ottawa (CA); Mathurin Wadjeu, Kanata (CA)

(73) Assignee: BlackBerry Limited, Waterloo (CA)

( * ) Notice: Subject to any disclaimer, the term of this patent is extended or adjusted under 35 U.S.C. 154(b) by 204 days.

(21) Appl. No.: 14/049,796

(22) Filed: Oct. 9, 2013

(65) Prior Publication Data

US 2015/0099509 A1     Apr. 9, 2015

(51) Int. Cl.
| | |
|---|---|
| *H04W 36/00* | (2009.01) |
| *H04W 4/00* | (2009.01) |
| *H04W 60/00* | (2009.01) |
| *H04W 36/14* | (2009.01) |
| *H04W 76/02* | (2009.01) |
| *H04W 88/06* | (2009.01) |
| *H04W 60/04* | (2009.01) |
| *H04W 48/18* | (2009.01) |

(52) U.S. Cl.
CPC ........ *H04W 60/005* (2013.01); *H04W 36/0022* (2013.01); *H04W 36/14* (2013.01); *H04W 48/18* (2013.01); *H04W 60/04* (2013.01); *H04W 76/026* (2013.01); *H04W 88/06* (2013.01)

(58) Field of Classification Search
CPC ..... H04W 60/00; H04W 36/24; H04W 24/02; H04W 12/06; H04W 36/0022; H04W 48/18; H04W 88/06; H04W 36/14; H04W 60/04; H04W 76/026; H04W 76/027; H04W 76/046; H04W 36/0055; H04W 76/02; H04W 36/34

USPC ........ 455/552.1, 435.2, 445, 435.1, 436, 437; 370/352, 353, 354, 355, 356
See application file for complete search history.

(56) References Cited

U.S. PATENT DOCUMENTS

| | | | |
|---|---|---|---|
| 8,837,357 B2* | 9/2014 | Dwyer et al. | 370/328 |
| 2010/0297979 A1* | 11/2010 | Watfa | H04W 8/205 455/404.1 |
| 2010/0316034 A1* | 12/2010 | Burbidge | H04W 36/0022 370/338 |
| 2011/0103277 A1* | 5/2011 | Watfa et al. | 370/310 |
| 2011/0183670 A1 | 7/2011 | Wu | |
| 2012/0071163 A1* | 3/2012 | Klingenbrunn | H04W 48/18 455/435.2 |
| 2013/0023265 A1 | 1/2013 | Swaminathan et al. | |

(Continued)

FOREIGN PATENT DOCUMENTS

| | | |
|---|---|---|
| WO | 2013/080098 | 6/2013 |
| WO | 2013/129994 | 9/2013 |

OTHER PUBLICATIONS

C1-120820, 3GPP TSG CT WG1 Meeting #76, Xiamen (P.R. China), Feb. 6-10, 2012, "Handling of update status upon combined TAU abnormal failure."

(Continued)

*Primary Examiner* — Olumide T Ajibade Akonai
(74) *Attorney, Agent, or Firm* — Moffat & Co.

(57) ABSTRACT

A method at a user equipment including detecting that a circuit switched (CS) call has been requested at the user equipment; if a most recent registration attempt or registration update attempt with a network of a first radio access technology (RAT) resulted in an abnormal state, registering with a network of a second RAT; and initiating the CS call with the network of the second RAT.

16 Claims, 5 Drawing Sheets

(56) References Cited

U.S. PATENT DOCUMENTS

2013/0183974 A1* 7/2013 Johansson et al. ............ 455/436
2013/0260745 A1* 10/2013 Johansson et al. ............ 455/423
2014/0051443 A1* 2/2014 Diachina ........... H04W 36/0022
　　　　　　　　　　　　　　　　　　　　　　　455/436
2014/0355417 A1* 12/2014 Kim et al. .................... 370/221

OTHER PUBLICATIONS

International Searching Authority, Written Opinion of the International Searching Authority, Dec. 30, 2014.

Nternational Searching Authority, International Search Report, Dec. 30, 2014.

* cited by examiner

METHOD AND APPARATUS FOR HANDLING CIRCUIT SWITCHED CALLS AT A USER EQUIPMENT

FIELD OF THE DISCLOSURE

The present disclosure is directed in general to circuit switched calls, and more specifically, to mobile originated circuit switched call performance.

BACKGROUND

The Third Generation Partnership Project (3GPP) defines a long-term evolution (LTE) architecture, which provides high data rate, low latency, packet optimization and improved system capacity and coverage. In an LTE system, an evolved universal terrestrial radio access network (E-UTRAN) includes a plurality of evolved Node-Bs (eNBs) and communicates with a plurality of mobile stations, also referred to as user equipments (UEs).

LTE technology supports packet based services only. However fallback is specified for circuit switched (CS) services as well. CS Fallback (CSFB) defines a mechanism for using a CS legacy network (e.g. the Global System for Mobile Communications (GSM)/Wideband Code Division Multiple Access (WCDMA)) to provide voice and traditional CS-domain services (e.g. voice call, a CS short message service (SMS), Unstructured Supplementary Service Data (USSD), among others). To provide these CS services, a UE may reuse the CS infrastructure when the UE is served by E-UTRAN.

When a CSFB capable UE selects an E-UTRAN, there is a combined Tracking Area Update/Location Area Update (TAU/LAU) with an international mobile subscriber identity (IMSI) attach procedure initiated. Further, when a CSFB capable UE camping on an E-UTRAN selects a tracking area that is different from one stored in it, there is a combined TA/LA update. Further, when a timer for periodic TA/LA expires, there is a combined TA/LA updating. Such procedures may result in mobile originated (MO) call failure.

BRIEF DESCRIPTION OF THE DRAWINGS

The present systems and methods will be better understood with reference to the drawings, in which.

DETAILED DESCRIPTION OF THE DRAWINGS

The present disclosure provides a method at a user equipment comprising: detecting that a circuit switched (CS) call has been requested at the user equipment; if a most recent registration attempt or registration update attempt with a network of a first radio access technology (RAT) resulted in an abnormal state, registering with a network of a second RAT; and initiating the CS call with the network of the second RAT.

The present disclosure further provides a user equipment comprising a processor configured to: detect that a circuit switched (CS) call has been requested at the user equipment; if a most recent registration attempt or registration update attempt with a network of a first radio access technology (RAT) resulted in an abnormal state, register with a network of a second RAT; and initiate the CS call with the network of the second RAT.

The long term evolution architecture is primarily packet based and this may present a challenge for circuit-switched services such as voice or short message service (SMS). One option to deal with such limitation in LTE is referred to as circuit switched fallback (CSFB), where a user equipment will fallback to a network using a second generation (2G) or a third generation (3G) radio access technology (RAT) for circuit switched calls while camping on the LTE network for packet switched services.

The UE will fallback to the 2G or 3G RAT on either a mobile originated (MO) or a mobile terminated (MT) call.

In order to accommodate the circuit switched fallback, the mobile switching center (MSC) server for the 2G or 3G RAT communicates with the mobility management entity (MME) for the LTE network.

Circuit switched fallback is provided for in the 3GPP LTE Technical Specification (TS) 23.272, *"Third Generation Partnership Project; Technical Specification Group Services and System Aspects; Circuit Switched (CS) Fallback in Evolved Packet System (EPS); Stage 2"*; v. 11.5.0, Jun. 2013, the contents of which are incorporated herein by reference. In particular the system architecture is provided in FIGS. 4.2-1 of the 3GPP TS 23.272 specification and is reproduced herein with regard to FIG. 1.

Figure 1:
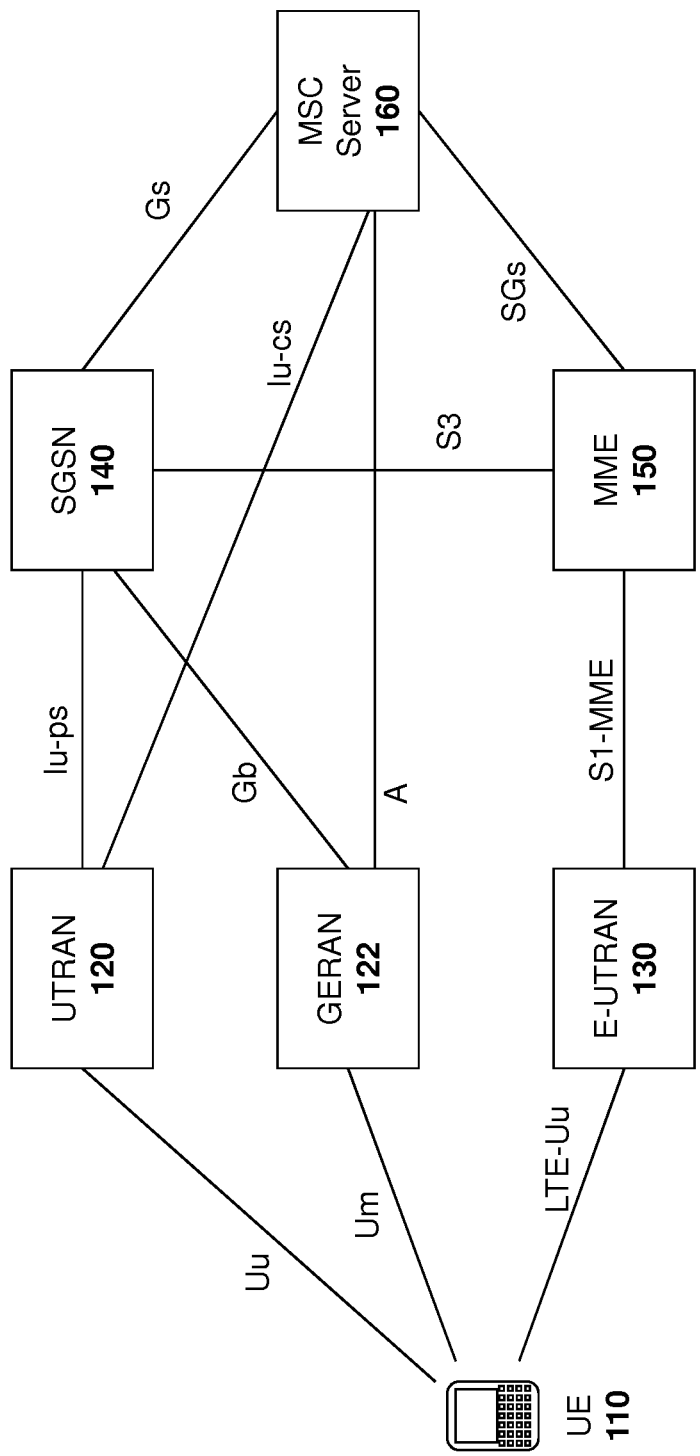
FIG. 1 is a block diagram of a mobile communication system.

Reference is now made to FIG. 1, which illustrates one embodiment of a mobile communication system that includes a 2G/3G RAT, as well as an LTE RAT.

In particular, a UE 110 is a multi-mode UE capable of communicating with both a network of an LTE RAT as well as a network of a 2G/3G RAT. As seen in FIG. 1, UE 110 communicates with either, or both of a universal mobile telecommunications system (UMTS) terrestrial radio access network (UTRAN) 120 or a GSM Edge Radio Access Network (GERAN) 122 for circuit switched services. UE 110 further communicates with an evolved-UTRAN (E-UTRAN) 130 for the LTE services.

Both UTRAN 120 and GERAN 122 communicate with a serving general packet radio service (GPRS) support node (SGSN) 140 for packet switched services and with MSC server 160 for circuit switched services.

The E-UTRAN communicates with MME 150.

In the CSFB system, MSC server 160 further communicates with MME 150.

During normal operation, UE 110 will camp on the LTE system. If a mobile terminated call is received then MSC server 160 will notify MME 150, which will then send a page to UE 110 through E-UTRAN 130 to transition to UTRAN 120 or GERAN 122. The UE 110 will then transition for the duration of the circuit switched call. At the end of the circuit switch call the UE then transitions back to the LTE system.

Packet switched services may either be suspended for the duration of the circuit switched call or may be transferred to SGSN 140, where the UE 110 will continue to receive packet data, although at a lower speed than from the LTE system.

For a mobile originated call, the UE 110 may transition to UTRAN 120 or GERAN 122 for the duration of the call. Again, packet switched services may either be suspended or transitioned to SGSN 140.

Figure 2:
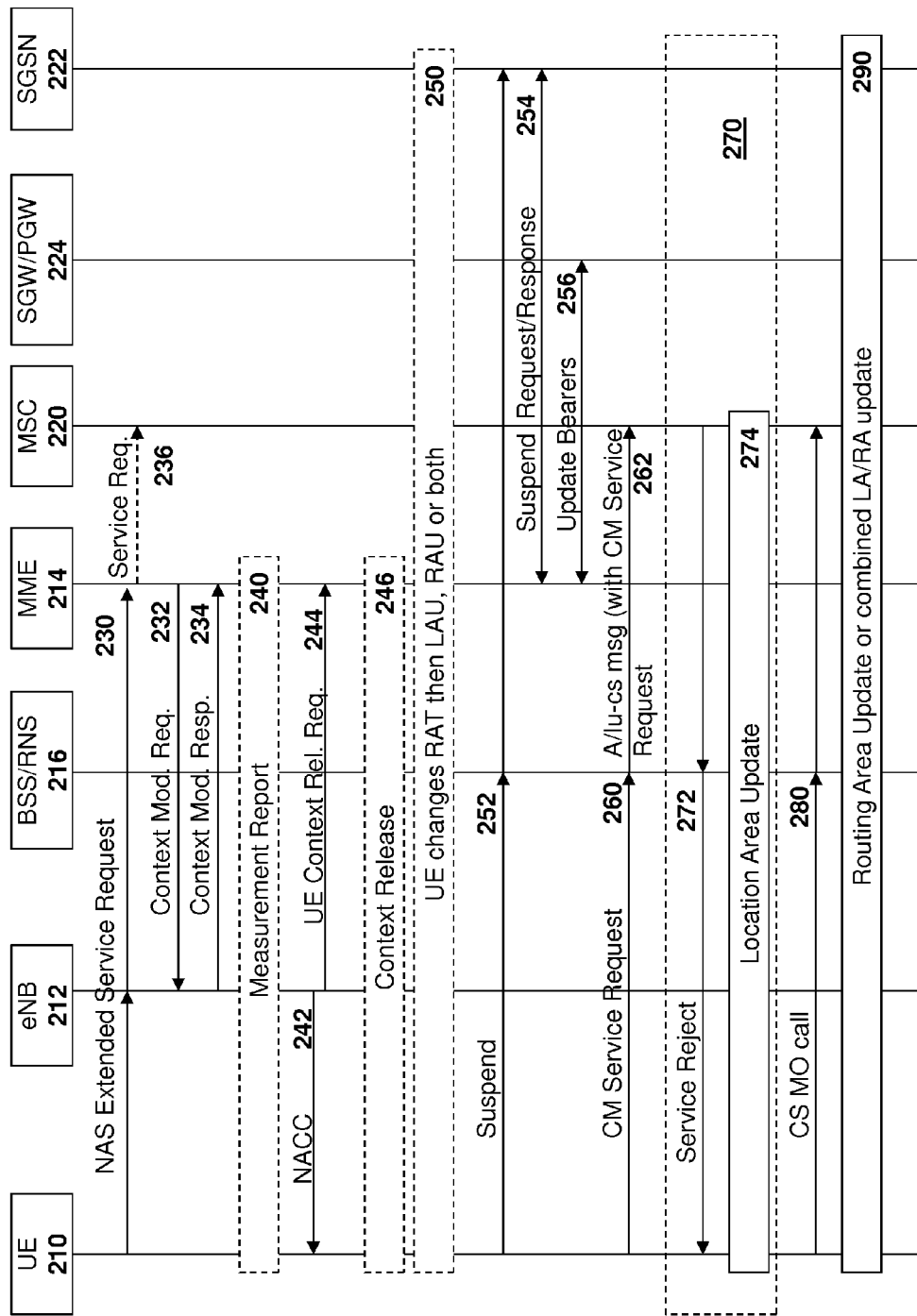
FIG. 2 is a data flow diagram showing an example circuit switched fallback process.

The typical process for a mobile originated call (without PS handover for simplicity) is provided in FIG. 2. FIG. 2 follows FIGS. 6.3-1 of the 3GPP TS 23.272 Specification.

In particular, a UE 210 communicates with a LTE eNB 212, which in turn communicates with MME 214.

The fallback for UE 210 has a base station subsystem/radio network subsystem (BSS/RNS) 216 which is controlled by MSC 220. Data on the fallback RAT is controlled through SGSN 222 and bearers are controlled using serving gateway/packet data network gateway (SGW/PGW) 224.

For a fallback based on a mobile originated call, UE 210 first provides a non-access spectrum (NAS) extended service request 230 to eNB 212, which forwards the message to MME 214.

In response, the MME provides a UE context modification request with a CS fallback indicator, as shown by message 232. The eNB 212 sends a response message 234 back to MME 214.

Depending on the configuration, the MME 214 may also send a message 236 to MSC 220 indicating that a CM service request message is due.

As shown by block 240, an optional measurement report may be solicited by MME 214 to determine a target GERAN/UTRAN cell for redirection.

In the embodiment of FIG. 2, it is assumed that a network supports inter-RAT cell change and thus eNB 212 may send message 242 to provide the inter-RAT cell change to a neighbor GERAN cell, for example. The message may optionally contain a network assisted cell change (NACC).

eNB 212 may then send a UE context release request to MME 214, as shown by message 244.

The UE's context is then released, as shown by block 246. The UE then changes RATs and may perform one of, or both of, a location area update (LAU) and a routing area update (RAU), as shown by block 250.

The UE then suspends packet services by sending a suspend message 252 to BSS/RNS 216 which forwards the message to SGSN 222. The suspension is then coordinated between MME 214 and SGSN 222, as shown by arrow 254 and the bearers are then updated, as shown by arrow 256. As indicated above, the example of FIG. 2 is for no PS handover.

At this point, UE 210 sends a CM service request to BSS/RNS 216, as shown by arrow 260 and BSS/RNS 216 sends the circuit switched message with the CM service request to MSC 220, as shown by arrow 262.

If the service request is rejected with reject cause IMSI unknown in visitor location registry (VLR), the process proceeds into block 270. For example, this may occur if the MSC has changed and the UE did no update its registration. In other cases, after the rejection with the cause IMSI unknown in VLR, any mobile terminated call subsequent to this may also fail due to the unknown registration state of the device.

If the process proceeds into block 270 then a service reject message 272 is forwarded from MSC 220, through BSS/RNS 216 to UE 210 and a location area update, as shown by block 274 is then performed.

After the location area update, or if no service rejection is received, the mobile originated call may occur as shown by arrow 280.

After the call, a routing area update may occur, as shown by block 290.

As will be appreciated, the rejection of the service at block 270 will cause the MO call to fail, and may cause poor user experience. One cause of a rejection may be the UE and network elements being in different states, as provided below.

Figure 3:
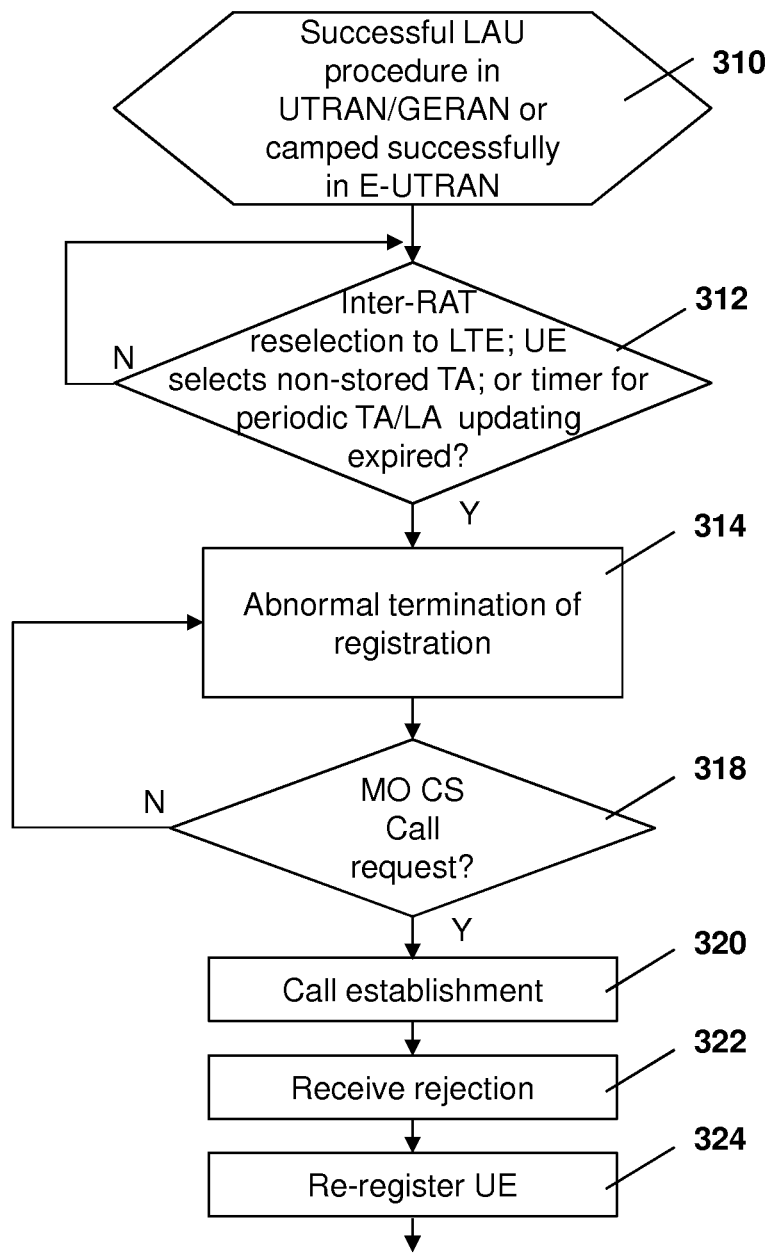
FIG. 3 a flow diagram showing one method according to the present disclosure where a CS mobile originated call fails.

Reference is now made to FIG. 3, where the process begins at block 310. In block 310 the UE starts with a successful LAU procedure in a 2G/3G RAT such as a UTRAN/GERAN establishing a public land mobile network/location area code (PLMN/LAC) or the UE being successfully camped in E-UTRAN.

The process next proceeds to block 312 in which a check is made to determine one or more of three factors: 1) whether the UE is configured to transition from a state of having a RRC connection with the UTRAN/GERAN system to a state of having RRC connection with the LTE system. In other words, the UE has an Inter-RAT re-selection to E-UTRAN; 2) whether the UE selects a non-stored TA; and 3) whether the timer for periodic TA/LA updating has expired. If no, the process loops at block 312, and otherwise to process proceeds to block 314.

As a result of Inter-RAT re-selection at block 312, a combined TAU/LAU with IMSI attach procedure may be initiated to register the UE. In some cases, the TAU/LAU may fail due to radio link failure RLF, release of RRC (radio resource control protocol) connection from the RAT, or any other reason. The result may be abnormal termination of the registration. In other cases, combined tracking area (TA)/location area (LA) updating may result in the abnormal termination.

In the example of FIG. 3, it is assumed that abnormal termination of the registration occurred, as shown by block 314. The UE will detect the abnormal termination of the registration and may, according to one embodiment of the present disclosure, consider the UE to be in an abnormal state with regards to registration. As used herein, the "abnormal state" refers to any state in which the UE and the network are not properly registered with each other, and may, for example, be due to RLF, release of RRC connection, or other causes during the registration process.

As a result of the abnormal termination of registration at block 314, the Evolved Packet System (ESP) mobility management (EMM) state is set to REGISTERED and the EMM sub state is EMM_REGISTERED_ATTEMPTING TO_UPDATE.

The CSFB call bit may be set to TRUE because the active RAT is E-UTRAN. Therefore, when a CS-domain service is requested the UE will undergo CSFB to establish CS-domain service.

A check at block 318 is then made for a MO CS-call (or other CS-domain service) request. If no MO CS-call is made, the process proceeds back to block 314.

If a MO CS call request is made, since the registration was abnormally terminated, a PLMN selection may be initiated in the gateway due to the MO call request. However, in this case the PLMN/LAC found may be the same as the UE had at the last successful registration at block 310. As a result no location update is initiated.

Based on the above, the UE and network registration may be unsynchronized as a result of abnormal termination of the registration at block 314. The network may have deregistered the UE IMSI due to the previous TAU attempt that did not complete. The UE, on the other hand, assumes it has successfully registered in the same PLMN/LAC as in block 310.

The TAU procedure was unsuccessful during the Inter-RAT reselection to E-UTRAN, therefore, the EMM was not fully registered to replace the registration information from the UTRAN/GERAN. The EMM may be in ATTEMPT TO UPDATE state and cannot handle the MO call request at block 318.

As a result of the MO call request the UE may initiate the call establishment procedure (CM SERVICE REQUEST 260 from FIG. 2) at block 320. The network may reject the CS call attempt (CM SERVICE REJECT, cause 4, IMSI unknown in VLR), as received by the UE at block 322.

As a result of the call request at block 320 and call failure at block 322 the UE may initiate a LAU request and re-register successfully, as shown by block 324. However, in this case the call attempt has already been aborted or has failed, resulting in a poor user experience.

Based on the above, although the radio resource release during the combined TAU/LAU IMSI attach (or combined TA/LA updating) is triggered by the network conditions, according to one embodiment of the present disclosure the UE may handle the conditions in order to establish the voice call successfully. In particular, in accordance with the present disclosure, the non-access stratum state machine at the UE may be modified to ensure that if a registration attempt is abnormally ended while a voice call attempt is detected, the UE may initiate a further registration attempt, even if the tracking area code (TAC)/location area code (LAC) provided in a broadcast channel message is the same as the last successfully registered TAC/LAC.

Figure 4:
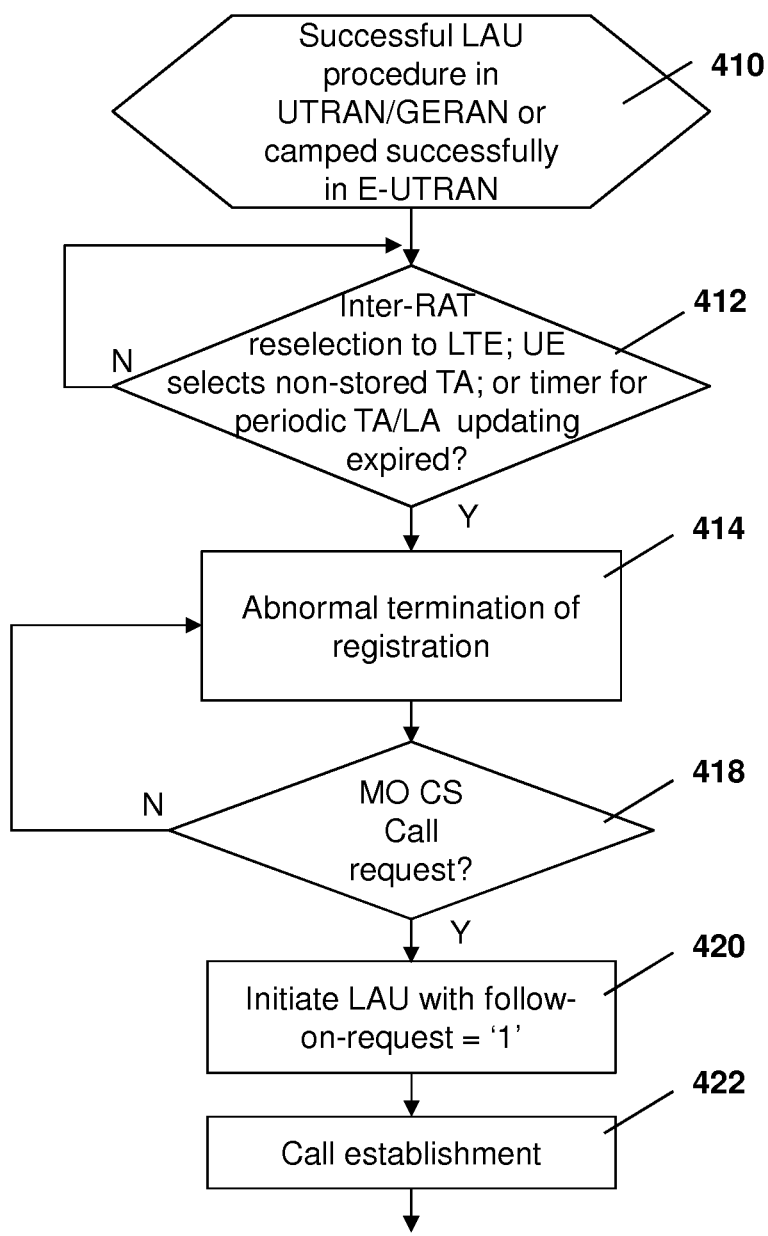
FIG. 4 is a flow diagram showing an embodiment of the present disclosure where the UE re-registers to prevent CS call failure.

Reference is now made to FIG. 4. In particular, the process of FIG. 4 starts at block 410 with a precondition that the UE starts with a successful LAU procedure in a 2G/3G RAT such as a UTRAN/GERAN establishing a public land mobile network/location area code (PLMN/LAC) or the UE is successfully camped in E-UTRAN. The process then proceeds to block 412 in which a check is made to determine one or more of three factors: 1) whether the UE is configured to transition from a state of having a RRC connection with the UTRAN/GERAN system to a state of having RRC connection with the LTE system. In other words, the UE has an Inter-RAT re-selection to E-UTRAN; 2) whether the UE selects a non-stored TA; and 3) whether the timer for periodic TA/LA updating has expired. If no, the process loops at block 412, and otherwise to process proceeds to block 414.

As a result of Inter-RAT re-selection at block 412, a combined TAU/LAU with IMSI attach procedure may be initiated to register the UE. In some cases, the TAU/LAU may fail due to radio link failure RLF, release of RRC (radio resource control protocol) connection from the network, or any other reason. The result may be abnormal termination of the registration. In other cases, combined tracking area (TA)/location area (LA) updating may result in the abnormal termination.

Again, in the example of FIG. 4, it is assumed that abnormal termination of the registration occurred, as shown by block 414. The UE will detect the abnormal termination of the registration and may, according to one embodiment of the present disclosure, consider the UE to be in an abnormal state with regards to registration.

As a result of the abnormal termination of registration at block 414, the Evolved Packet System (ESP) mobility management (EMM) state is set to REGISTERED and the EMM sub state is EMM_REGISTERED_ATTEMPTING TO_UPDATE.

The CSFB call bit may be set to TRUE because the active RAT is E-UTRAN. Therefore, when a CS-domain service is requested the UE will undergo CSFB to establish CS-domain service.

A check at block 418 is then made for a MO CS-call (or other CS-domain service) request. If no MO CS-call is made, the process proceeds back to block 314.

If a MO CS call request is made the process proceeds from block 418 to block 420 in which a registration attempt with a network of the 2G/3G RAT is initiated. The registration attempt may be in the form of an LAU. Further, a follow_on_request flag may optionally be used to instruct a network not to release the radio resource when the LAU proceed is complete. In fact in the LAU accepted message, the network will set a corresponding flag (follow_on_proceed) to 1 to let the UE know that it can now send the CM_SERVICE_REQUEST. If the follow_on_request flag is not set to 1, the network will release the radio resource connection after the LAU accepted. Thus the follow_on_request flag may be used to optimize the registration process when a CS call is pending.

In one embodiment a check may be made after the registration at block 420 to ensure success and if the registration is not successful the process could be ended or block 420 could be repeated.

From block 420 the process proceeds to block 422 in which the pending call is initiated. In this case, since registration occurs, the CS call establishment succeeds in the embodiment of FIG. 4, avowing the poor user experience described above with regards to FIG. 3.

The above embodiments may be implemented by any UE. One exemplary device is described below with regard to FIG. 5.

UE 500 is typically a two-way wireless communication device having voice and/or data communication capabilities. UE 500 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 500 is enabled for two-way communication, it may incorporate a communication subsystem 511, including both a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate. The radio frequency front end of communication subsystem 511 can be any of the embodiments described above.

Network access requirements will also vary depending upon the type of network 519. In some networks network access is associated with a subscriber or user of UE 500. A UE may require a removable user identity module (RUIM) or a subscriber identity module (SIM) card in order to operate on a network. The SIM/RUIM interface 544 is normally similar to a card-slot into which a SIM/RUIM card can be inserted and ejected. The SIM/RUIM card can have memory and hold many key configurations 551, and other information 553 such as identification, and subscriber related information.

Figure 5:
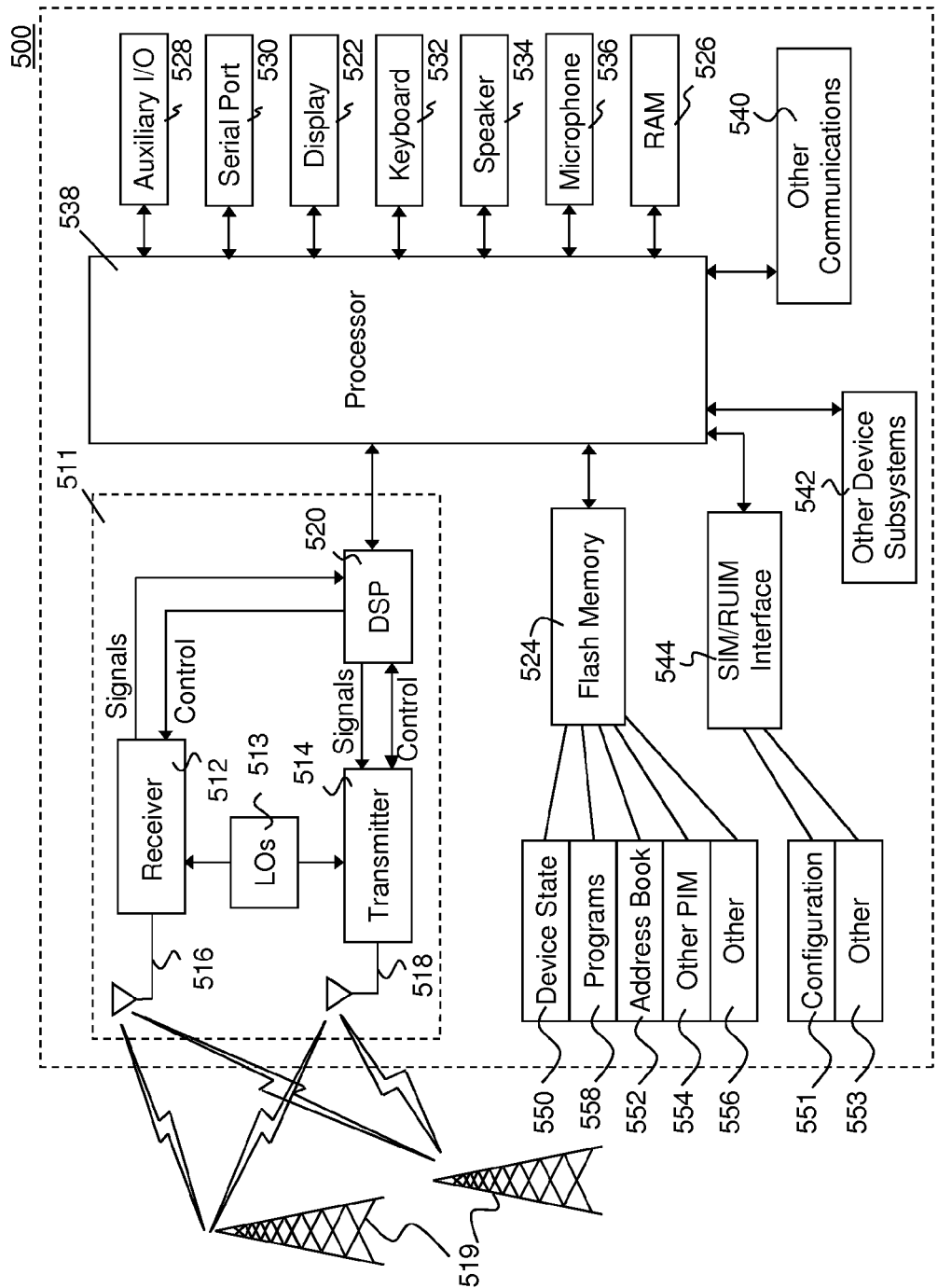
FIG. 5 is a block diagram of an example UE capable of implementing the methods and systems of the present disclosure.

When required network registration or activation procedures have been completed, UE 500 may send and receive communication signals over the network 519. As illustrated in FIG. 5, network 519 can consist of multiple base stations communicating with the UE. Further, as described above, a multi-mode UE may communicate with base stations of different networks 519, for example a WCDMA and an LTE network.

Signals received by antenna 516 through communication network 519 are input to receiver 512, which may perform such common receiver functions as signal amplification, frequency down conversion, filtering, channel selection and the like. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

UE 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem and any other device subsystems generally designated as 542. Serial port 530 could include a USB port or other port known to those in the art.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Processor 538, in addition to its operating system functions, may enable execution of software applications on the UE. A predetermined set of applications that control basic operations, including at least data and voice communication applications for example, will normally be installed on UE 500 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 519. Further applications may also be loaded onto the UE 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both. For example, secure communication applications may enable electronic commerce functions and other such financial transactions to be performed using the UE 500.

In a data communication mode, a received signal such as a text message or web page download will be processed by the communication subsystem 511 and input to the processor 538, which may further process the received signal for output to the display 522, or alternatively to an auxiliary I/O device 528.

A user of UE 1500 may also compose data items such as email messages for example, using the keyboard 532, which may be a complete alphanumeric keyboard or telephone-type keypad, or a virtual keyboard, among others, in conjunction with the display 522 and possibly an auxiliary I/O device 528. Such composed items may then be transmitted over a communication network through the communication subsystem 511.

For voice communications, overall operation of UE 500 is similar, except that received signals would typically be output to a speaker 534 and signals for transmission would be generated by a microphone 536. Alternative voice or audio I/O subsystems, such as a voice message recording subsystem, may also be implemented on UE 500. Although voice or audio signal output is generally accomplished primarily through the speaker 534, display 522 may also be used to provide an indication of the identity of a calling party, the duration of a voice call, or other voice call related information for example.

Serial port 530 in FIG. 5 may be implemented in a personal digital assistant (PDA)-type UE for which synchronization with a user's desktop computer (not shown) may be desirable, but is an optional device component. Such a port 530 would enable a user to set preferences through an external device or software application and would extend the capabilities of UE 500 by providing for information or software downloads to UE 500 other than through a wireless communication network. The alternate download path may for example be used to load an encryption key onto the device through a direct and thus reliable and trusted connection to thereby enable secure device communication. As will be appreciated by those skilled in the art, serial port 530 can further be used to connect the UE to a computer to act as a modem or for charging purposes.

Other communications subsystems 540, such as a short-range communications subsystem, is a further optional component which may provide for communication between UE 500 and different systems or devices, which need not necessarily be similar devices. For example, the subsystem 540 may include an infrared device and associated circuits and components or a Bluetooth™ communication module to provide for communication with similarly enabled systems and devices. Subsystem 540 may further include non-cellular communications such as WiFi or WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Various exemplary clauses may include:

AA. A method at a user equipment comprising: detecting that a circuit switched (CS) call has been requested at the user equipment; if a most recent registration attempt or registration update attempt with a network of a first radio access technology (RAT) resulted in an abnormal state, registering with a network of a second RAT; and initiating the CS call with the network of the second RAT.

BB. The method of clause AA, wherein the first RAT is a packet switched only RAT.

CC. The method of clause AA or clause BB, further comprising reselecting to the network of the second RAT for the CS call.

DD. The method of clause CC, wherein the reselecting to the network of the second RAT includes registering with the network of the second RAT.

EE. The method of clause CC, wherein the registering with the network of the second RAT is performed even if a tracking area code or a location area code of a last successful network registration matches the tracking area code or location area code in a broadcast message from the network of the second RAT.

FF. The method of clause EE, wherein the registering is in the form of a location area update that utilizes a follow_on_request flag.

GG. The method of clause CC, wherein the reselecting comprises sending a CM service request to the network of the second RAT.

HH. The method of any one of clauses AA to GG, wherein the most recent registration attempt with the network of the first RAT is in an abnormal state due to a radio link failure or a radio resource control connection release.

II. The method of clause HH, wherein the abnormal state is based on a reject cause indicating an identifier is unknown in a visitor location registry.

JJ. The method of any one of clauses AA to II, further comprising, after the registering with the network of the second RAT, checking whether the re-registration is successful, and if not ending the process.

KK. The method of any one of clauses AA to JJ, further comprising, after the registering with the network of the second RAT, checking whether the re-registration is successful, and if not proceeding back to registering with the network of the second RAT.

LL. The method of any one of clauses AA to KK, wherein the first RAT is an evolved-universal terrestrial radio access (E-UTRAN) RAT.

MM. The method of any one of clauses AA to LL, wherein the second RAT is a global system for mobile communications (GSM) RAT or universal terrestrial radio access network (UTRAN) RAT.

NN. The method of any one of clauses AA to MM, wherein the circuit switched call is a voice call.

OO. A user equipment comprising a processor configured to: detect that a circuit switched (CS) call has been requested at the user equipment; if a most recent registration attempt or registration update attempt with a network of a first radio access technology (RAT) resulted in an abnormal state, register with a network of a second RAT; and initiate the CS call with the network of the second RAT.

PP. The user equipment of clause OO, wherein the first RAT is a packet switched only RAT.

QQ. The user equipment of clause OO or PP, wherein the user equipment is configured to reselect to the network of the second RAT for the CS call.

RR. The user equipment of clause QQ, wherein the reselecting to the network of the second RAT includes registering with the network of the second RAT.

SS. The user equipment of clause QQ, wherein the processor is configured to register with the network of the second RAT even if a tracking area code or a location area code of a last successful registration matches the tracking area code or location area code in a broadcast message from the network of the second RAT.

TT. The user equipment of clause QQ, wherein the registration with the network of the second RAT is in the form of a location area update that utilizes a follow_on_request flag.

UU. The user equipment of clause QQ, wherein the processor is configured to reselect by sending a CM service request to the network of the second RAT.

VV. The user equipment of any one of clauses OO to UU, wherein the most recent registration attempt with the network of the first RAT resulted in an abnormal state due to a radio link failure or a radio resource control connection release.

WW. The user equipment of clause VV, wherein the abnormal state is based on a reject cause indicating an identifier is unknown in a visitor location registry.

XX. The user equipment of any one of clauses OO to WW, wherein the processor is further configured to, after the registering with the network of the second RAT, check whether the registration is successful, and if not end the process.

YY. The user equipment of any one of clauses OO to XX, wherein the processor is further configured to, after the registering with the network of the second RAT, check whether the registration is successful, and if not proceeding back to register with the network of the second RAT.

ZZ. The user equipment of any one of clauses OO to YY, wherein the first RAT is an evolved-universal terrestrial radio access (E-UTRAN) RAT.

AAA. The user equipment of any one of clauses OO to ZZ, wherein the second RAT is a global system for mobile communications (GSM) RAT or universal terrestrial radio access network (UTRAN) RAT.

BBB. The user equipment of any one of clauses OO to AAA, wherein the circuit switched call is a voice call.

The invention claimed is:
1. A method at a user equipment comprising:
  detecting that a circuit switched (CS) call has been requested at the user equipment and initiating a circuit switched fallback (CSFB) procedure;
  determining if a most recent registration attempt or registration update attempt with a network of a first radio access technology (RAT) resulted in an abnormal state;
  registering with a network of a second RAT it the abnormal state is detected even if a tracking area code or a location area code of a last successful network registration matches the tracking area code or location area code in a broadcast message from the network of the second RAT;
  initiating the CS call with the network of the second RAT; and
  reselecting to the network of the second RAT for the CS call.

2. The method of claim 1, wherein the first RAT is a packet switched only RAT.

3. The method of claim 1, wherein the reselecting to the network of the second RAT includes the registering with the network of the second RAT.

4. The method of claim 1, wherein the registering is in the form of a location area update that utilizes a follow_on_request flag.

5. The method of claim 1, wherein the reselecting comprises sending a CM service request to the network of the second RAT.

6. The method of claim 1, wherein the most recent registration attempt with the network of the first RAT is in an abnormal state due to a radio link failure or a radio resource control connection release.

7. The method of claim 6, wherein the abnormal state is based on a reject cause indicating an identifier is unknown in a visitor location registry.

8. The method of claim 1, further comprising, checking whether the registering is successful, and if not ending the process.

9. The method of claim 1, further comprising, checking whether the registering is successful, and if not proceeding back to registering with the network of the second RAT.

10. The method of claim 1, wherein the first RAT is an evolved-universal terrestrial radio access (E-UTRAN) RAT.

11. The method of claim 1, wherein the second RAT is a global system for mobile communications (GSM) RAT or universal terrestrial radio access network (UTRAN) RAT.

12. The method of claim 1, wherein the circuit switched call is a voice call.

13. A user equipment comprising a processor configured to:
- detect that a circuit switched (CS) call has been requested at the user equipment and initiate a circuit switched fall back procedure;
- determine if a most recent registration attempt or registration update attempt with network of a first radio access technology (RAT) resulted in an abnormal state;
- register with a network of a second RAT if the abnormal state is determined even if a tracking area code or a location area code of a last successful registration matches the tracking area code or location area code in a broadcast message from the network of the second RAT;
- initiate the CS call with the network of the second RAT; and
- reselect to the network of the second RAT for the CS call.

14. The user equipment of claim 13, wherein the first RAT is a packet switched only RAT.

15. The user equipment of claim 13, wherein the reselect to the network of the second RAT includes registering with the second RAT.

16. The user equipment of claim 13, wherein the registration with the network of the second RAT is in the form of a location area update that utilizes a follow_on_request flag.

\* \* \* \* \*